(12) United States Patent
Haschke et al.

(10) Patent No.: US 9,114,477 B2
(45) Date of Patent: Aug. 25, 2015

(54) DEVICE AND METHOD FOR JOINING WORKPIECES BY MEANS OF A LASER BEAM AND MOVABLE PRESSING ELEMENT

(75) Inventors: Igor Haschke, Berlin (DE); Arwed Kilian, Ludwigsfelde (DE)

(73) Assignee: Scansonic MI GmbH, Berlin (DE)

( * ) Notice: Subject to any disclaimer, the term of this patent is extended or adjusted under 35 U.S.C. 154(b) by 321 days.

(21) Appl. No.: 13/883,762

(22) PCT Filed: Oct. 20, 2011

(86) PCT No.: PCT/DE2011/075254
§ 371 (c)(1),
(2), (4) Date: May 7, 2013

(87) PCT Pub. No.: WO2012/062308
PCT Pub. Date: May 18, 2012

(65) Prior Publication Data
US 2013/0220983 A1   Aug. 29, 2013

(30) Foreign Application Priority Data

Nov. 9, 2010  (DE) .......................... 10 2010 060 459
Jun. 1, 2011  (DE) .......................... 10 2011 050 798
Jun. 3, 2011  (DE) .......................... 10 2011 050 832

(51) Int. Cl.
| | |
|---|---|
| B23K 26/02 | (2014.01) |
| B23K 26/04 | (2014.01) |
| B23K 26/08 | (2014.01) |
| B23K 26/42 | (2006.01) |
| B23K 37/04 | (2006.01) |
| B23K 26/30 | (2014.01) |
| B23K 26/03 | (2006.01) |
| B23K 26/14 | (2014.01) |
| B23K 26/22 | (2006.01) |
| B23K 26/24 | (2014.01) |
| B23Q 27/00 | (2006.01) |

(52) U.S. Cl.
CPC .............. *B23K 26/041* (2013.01); *B23K 26/02* (2013.01); *B23K 26/023* (2013.01); *B23K 26/03* (2013.01); *B23K 26/032* (2013.01); *B23K 26/034* (2013.01); *B23K 26/04* (2013.01); *B23K 26/08* (2013.01); *B23K 26/0807* (2013.01); *B23K 26/1464* (2013.01); *B23K 26/22* (2013.01); *B23K 26/24* (2013.01); *B23K 26/42* (2013.01); *B23K 37/04* (2013.01); *B23K 37/0443* (2013.01); *B23K 2201/006* (2013.01); *B23K 2201/18* (2013.01); *B23Q 27/00* (2013.01)

(58) Field of Classification Search
CPC ........ B23K 26/02; B23K 26/04; B23K 26/08; B23K 26/42; B23K 37/04; B23Q 27/00
USPC ........... 219/121.62–121.64, 121.86; 269/126, 269/146; 228/212, 213; 700/166, 173; 81/98, 99
See application file for complete search history.

(56) References Cited

U.S. PATENT DOCUMENTS

| | | | | |
|---|---|---|---|---|
| 5,900,171 A | * | 5/1999 | Karube et al. | ........... 219/121.79 |
| 2005/0230363 A1 | | 10/2005 | Debuan et al. | |
| 2005/0237019 A1 | * | 10/2005 | Neumann et al. | ............. 318/570 |
| 2007/0289957 A1 | * | 12/2007 | Eiterer et al. | ............ 219/121.78 |
| 2011/0278265 A1 | * | 11/2011 | Kessler et al. | ........... 219/121.63 |

FOREIGN PATENT DOCUMENTS

| | | |
|---|---|---|
| JP | 58 047588 A | 3/1983 |
| JP | 58 053384 A | 3/1983 |
| JP | 5 077071 A | 3/1993 |

\* cited by examiner

*Primary Examiner* — Samuel M Heinrich
(74) *Attorney, Agent, or Firm* — Michael Soderman

(57) ABSTRACT

The invention relates to a method and a device for joining workpieces by means of a laser beam, wherein the device comprises: a scanner optics for guiding the laser beam; a press element, which, during the joining process, is pressed along a pressing direction onto at least one of the workpieces; and a housing, which houses the scanner optics and the laser beam running from the scanner optics towards the workpieces, wherein the press element forms a part of the housing and is movable relative to the rest of the housing by at least one degree of movement freedom.

10 Claims, 5 Drawing Sheets

DEVICE AND METHOD FOR JOINING WORKPIECES BY MEANS OF A LASER BEAM AND MOVABLE PRESSING ELEMENT

CROSS REFERENCE TO RELATED APPLICATIONS

This application is the U.S. national stage of International Application No. PCT/DE2011/075254, filed on Oct. 20, 2011, and claims the benefit thereof. The international application claims the benefits of German Application DE 102010060459.3 filed on Nov. 9, 2010; German Application DE 102011050798.1 filed on Jun. 1, 2011 and German Application DE 102011050832.5 filed on Jun. 3, 2011; all applications are incorporated by reference herein in their entirety.

BACKGROUND

The invention relates to a laser welding device for joining workpieces by means of a laser beam, and to a corresponding method.

Laser beam welding is used in particular in situations in which workpieces have to be joined with high welding travel speed, narrow weld seam shape and low thermal distortion. The workpieces to be joined are fixed in the respective desired position, for example by means of receiving or fixing devices provided for this purpose, and are then connected to one another by means of laser beam welding.

Due to the high light intensities used during laser welding, laser welding devices are general operated in a separate safety cabin, which ensures that the surrounding environment is shielded from the laser radiation. However, such safety cabins increase the spatial requirement of such a device since they generally house the entire laser beam machining device, and the operation of the cabins is complex and costly.

EP 2 149 421 A1 describes a device for welding workpieces by a means of a laser beam, wherein the laser beam of a fibre laser is focused by means of a collimator arranged in a housing. The collimator, which is provided in a pressure portion or pressure piece of the housing, can be moved by means of a linear drive parallel to a discharge slit in such a way that the laser beam can exit from the housing through the discharge slit and can produce a straight weld seam on a workpiece, which is fixed between the pressure piece of the housing and a second pressure piece.

The described linear guidance only enables beam guidance in a straight line, however, and therefore the workpieces to be welded have to be repeatedly repositioned in order to produce curved weld seams, said process therefore requiring an accordingly high expenditure of time. Furthermore, the feed rate of the laser process is predefined by the linear drive and for example is limited due to the mechanical stability of the collimator system, wherein such collimators generally comprise sensitive optical components and therefore for example should not be exposed to excessively high accelerations.

Furthermore, EP 2 149 421 A1 does not specify the shape or design of the workpieces to be machined; for example the described device and the respective pressure pieces do not take into account the fact that the shape of the workpieces to be fixed may vary and/or that workpieces with an irregular (for example non-co-planar, but for example three-dimensionally curved or stepped) shape may have to be machined. When machining workpieces with such an irregular design, it may be for example that the discharge slit of the housing cannot be completely covered by the workpiece, and therefore laser radiation may exit past the workpiece from the housing and for example may come into contact with individuals.

DETAILED DESCRIPTION

The object of the invention is to provide a laser welding device for joining workpieces (for example metal sheets) by means of a laser beam, and also a corresponding method, which enable laser machining of workpieces having different geometries or shapes with a high welding travel speed and at the same time reliably prevent an exit of laser radiation.

The object is achieved by a device according to claim 1 and by a method according to claim 10; advantageous developments of the invention are described in the dependent claims.

According to the invention, a laser welding device for joining workpieces (for example metal sheets or workpieces made of plastic) by means of a laser beam is provided, wherein the laser welding device comprises a scanner optics for guiding the laser beam (in the direction toward the workpieces) and at least one press element, which, during the joining process, is pressed or pushed along a corresponding pressing direction onto at least one of the workpieces to be joined in order to fix the workpieces. Furthermore, the laser welding device comprises a (for example multi-part) housing, which (at least in part or completely) houses the scanner optics and the laser beam running from the scanner optics towards the workpieces. The press element forms a part of the housing and is movable (actively and/or passively) relative to the rest of the housing by at least one degree of movement freedom. For example, the press element can be movably mounted on the rest of the housing ("remainder of the housing"), that it to say can be movably connected to the remainder of the housing; the press elements can also be mounted separately from the remainder of the housing so as to be movable relative thereto. Furthermore, a plurality of press elements of the above-described type may be provided.

The housing can be formed for example in such a way that it is open toward the workpiece or workpieces and in that, when the press element rests on the workpiece or workpieces as part of the housing, the housing together with the workpiece or workpieces fully houses the laser beam, wherein the workpiece or workpieces then close the opening in the housing so to speak.

The at least one press element, in order to fix the workpieces, is pressed along a corresponding pressing direction (that is to say the direction of the pressure exerted by a press element when fixing the workpieces) onto at least one of the workpieces, wherein the workpieces for example are clamped and therefore fixed between the press element and a corresponding abutment (for example a further press element). Since the press element simultaneously serves as part of the housing in order to shield the laser radiation, that is to say as a shield element, a space-saving arrangement can be produced.

Since the press element/the press elements is/are mounted movably relative to the remainder of the housing, workpieces having different three-dimensional shapes can thus be fixed reliably whilst the housing is simultaneously closed in a light-proof manner, for example by using the at least one degree of movement freedom to orientate the press element during the pressing process in accordance with the surface shape of the workpiece to be fixed, such that the press element rests on the workpiece without a gap.

In order to eliminate a hazard posed to individuals, the switching on and off of the laser beam may be synchronised with the resting and lifting of the press element; that is to say the laser is only switched on when or (shortly) after the press element is rested on the metal sheet, and is only switched off when or (shortly) before the press element is lifted again. Such a synchronised switching of the laser can be performed automatically for example via suitable switches or sensors.

The intensity of scattered laser radiation (for example scattered at the workpieces) is preferably detected by sensors arranged inside and/or outside the housing and integrated into a safety circuit. The scattered radiation intensity can be detected and evaluated electronically for example, wherein, when a limit value is exceeded, an alarm can be triggered and/or the joining process can be interrupted.

In accordance with an embodiment, the scanner optics comprises at least one movable scanner mirror in order to guide the laser beam.

The laser beam can be generated for example by a laser arranged inside the housing, or can be generated by a laser arranged outside the housing and can be guided into the housing to the scanner optics by means of light-guiding optical elements (for example optical fibres, mirrors, lenses, etc.), wherein the light-guiding elements and the radiation guidance from the laser to the scanner optics are preferably encased in a light-proof manner.

The scanner optics may comprise for example a focusing device for setting the focus position of the laser beam and at least one scanner mirror or deflection mirror arranged pivotably (for example by means of a galvanometer drive) in order to guide or reposition the laser beam (or the focus position of the laser beam). Since such deflection mirrors can be kept relatively small and therefore generally have a low moment of inertia, they enable rapid repositioning of the mirrors to another angular position and therefore rapid repositioning of the laser beam. Furthermore, the scanner optics may comprise two scanner mirrors for example, which are pivotable about (galvanometer) axes running perpendicularly with respect to one another, such that the laser beam can be guided two-dimensionally by a means of reflection on the mirrors and a corresponding change to the angular position of the mirrors, wherein for example curved weld seams can be produced in a time-effective manner without repositioning the workpieces to be machined.

In accordance with one embodiment, the at least one press element is mounted pivotably or tiltably on the rest of the housing about an axis running (substantially) perpendicularly with respect to the pressing direction.

In accordance with this embodiment, the press element can for example tilt about the aperture angle of the wedge-shaped workpiece when placed on the workpiece (when a press element with a straight or planar press portion is used and the workpiece to be clamped or to be fixed has a wedge-shaped (and for example non-co-planar) design), such that the press portion of the press element bears in a planar manner on the wedge surface and laser light is thus prevented from passing between the press element and the workpiece.

The press element, for example by means of a universal ball joint, may also be mounted pivotably or tiltably about a plurality of axes or about two axes perpendicular with respect to one another.

In accordance with one embodiment, the at least one press element is mounted or fitted on the rest of the housing so as to be movable, for example displaceable, along the pressing direction (relative to the rest of the housing).

For example, a plurality of press elements displaceable along the pressing direction may be provided, wherein for example, when fixing a step-shaped workpiece, each of the press elements can be displaced via its press portion to a height corresponding to a respective step of the workpiece, such that such a stepped workpiece can be clamped in a light-proof manner.

For example, such a press element can be moved along the pressing direction (actively and/or passively) into the remainder of the housing (that is to say into the rest of the housing) or can be moved out in the direction towards a workpiece to be fixed. For example, the press element may be fitted on the rest of the housing so as to be passively movable by means of springs (for example spiral springs or pneumatic springs), in such a way that, when the press element is placed on a workpiece, the placement movement is cushioned.

Furthermore, such a press element can be arranged on the rest of the housing so as to be actively movable, for example by means of electromotive or hydraulic actuators, for example in such a way that it can be moved towards and away from the workpieces independently of a movement of the rest of the housing. For example, this has the advantage that, for a positional change of the device or for an updating of the workpieces to be joined, the entire housing does not necessarily need to be lifted slightly from the workpiece by means of the actuators, but merely the housing parts serving as a press element. In addition, it is possible to identify irregularities on the workpiece or the device (for example on the press elements), for example by establishing the deviation of the reached position from a target position. Faults such as weld beads on the workpiece, inadmissible undulation of the metal sheets or defective metal sheet thicknesses can thus be recognised.

Furthermore, it can be ensured as a result of corresponding actuators that the press elements bear against the metal sheets with a defined pressing force, for example by establishing and monitoring the position and pressure of the elements via a motor current evaluation, a capacitive sensor system and/or an ultrasonic sensor. The force necessary to open the press elements can thus be measured, whereby for example any adhesions of the press elements to the workpiece can be detected, and damage to the device can be avoided.

In accordance with one embodiment, the at least one press element comprises a press portion made of a flexible (that is to say resiliently deformable) material.

In accordance with this embodiment, the press portion (that is to say the portion of the press element that, when a workpieces is fixed, comes into contact therewith) or the end face of the press element for example may comprise a seal element made of a flexible (and for example heat-resistant) material or may consist of a flexible material. The entire press element may also be formed from a flexible material. The press element (or the shape thereof) may thus adapt, when pressed against a workpiece, to the surface shape of the workpiece and a light-proof closure can thus be enabled between the press element and workpiece, wherein the degree of movement freedom of the press element is given by the resilient deformation thereof; in addition, such a flexible material may eliminate the formation of pressure marks on the workpiece.

The above-described degrees of movement freedom of the press element (the pivoting or tilting, the movement in a straight line and the resilient deformation) can also be combined arbitrarily, wherein for example a light-proof closure can be produced reliably between a workpiece and the press element by means of a press element that is arranged pivotably and displaceably (in a straight line) on the remainder of the housing and that comprises a flexible press portion.

In accordance with a further embodiment, the housing comprises a plurality of press elements, which each form part of the housing for shielding the laser radiation and are movable (for example separately) relative to the rest of the housing by at least one degree of movement freedom in each case, wherein one or more of the above-described degrees of freedom may be provided for each of the elements for example.

As explained above on the basis of the example of a step-shaped workpiece, irregularly shaped three-dimensional workpieces can be fixed reliably by means of this embodiment with a simultaneous light-proof closure between the press elements and the respective workpiece surface, for example since each of the press elements contacts a sub-area of the workpiece surface to be considered as merely approximately flat and does not have to cover the entire irregularly shaped (for example arcuately curved) workpiece surface.

In accordance with one embodiment, the scanner optics is designed in such a way that the laser beam can be deflected therefrom to a respective one of the press elements and to the workpiece fixed by means of this press element.

For example, a number of workpieces can be fixed at the same time by means of respective press elements. In accordance with this configuration, the beam guidance, for example by means of deliberate switchover of the beam guidance between different beam guidance optics or by means of a controllable beam guidance optics, can also be deflected to the respective press elements or the workpieces fixed thereby, wherein for example workpieces of different geometries can be machined at the same time by a single device and/or a plurality of seams and/or workpieces can be produced during a single clamping procedure.

In accordance with a further embodiment, the laser welding device is formed as a pair of tongs (also referred to hereinafter as "welding tongs"), wherein the housing together with the at least one press element forms one branch of the welding tongs, and a support together with at least one further press element forms the second branch of the welding tongs. Similarly to the above-described configurations, the press element(s) on the support can be (actively and/or passively) movable relative to the support by at least one degree of movement freedom.

In accordance with a further embodiment, the laser welding device is formed as a pair of welding tongs, in which each branch of the welding tongs comprises a housing, in which a scanner optics for guiding a laser beam is arranged, with at least one press element. For example, scanner optics that can be controlled independently of one another can be received in the housings, wherein metal sheets for example can be joined simultaneously from two sides with such a device.

A sensor (for example a pyroelectric sensor) is preferably arranged on the support or in the respective housings of such welding tongs and enables the process location to be monitored. By integrating the sensor into the control unit of the respective machining laser, root penetration, seam collapses as a result of excessive heat input, or excessively weak seams caused by insufficient heat input into the joining points can thus be reliably prevented. The possibility of an indirect power measurement directly at the workpiece is advantageous with the use of such a control unit. When using this power control assisted by means of sensor, a quality-monitored process can be insured. Furthermore, the process window can be enlarged by the knowledge of the required laser power. It is additionally possible to identify and quantify changes to the optical system (for example obstruction of protective glass panels) in good time.

Furthermore, the use of such a sensor allows one-sided machining without laser-secure backing run, since root penetration can be reliably prevented by means of a suitable signal processing of the sensor and the integration into the laser safety circuit. One-sided accessibility, which opens up a large number of additional possible applications, is particularly advantageous.

For example in order to produce short or interrupted weld seams, the press elements can be opened and closed in a synchronised manner at the two branches of the welding tongs, wherein the entire device (or the workpieces to be joined) is shifted in the feed direction, for example by the amount of the previously produced seam, before the press elements are closed again. The machining laser can be switched on and off in an accordingly synchronised manner, such that an exit of the laser beam when the welding tongs are open is avoided.

For example for producing long, uninterrupted weld seams, ultrasonic pulses may also be introduced into the workpiece via the press element during the joining process, in such a way that the device (or the workpieces to be joined) can be shifted slightly in spite of the press elements resting on the workpiece; (active) opening and closing of the press elements or an interruption of the joining process therefore is unnecessary.

The workpieces may be fixed by means of press elements arranged one inside the other, wherein for example each housing or each branch of a corresponding pair of welding tongs comprises an outer press element and inner press element surrounded thereby wherein these two press elements are nested one inside the other so to speak. In accordance with this configuration, one of the press elements for example is arranged on the workpiece during the joining process and is displaced together with the workpiece fixed thereby against the feed direction of the laser process synchronously therewith, whereas the other press element is lifted from the workpiece and is moved in the feed direction of the laser process, wherein the feed rate of this press element is greater than the feed rate of the laser process. When or (shortly) before the press element bearing against the workpiece reaches its predefined end position, the previously lifted press element is placed on the workpiece and then moved together therewith against the feed direction of the laser process synchronously therewith, whereas the press element previously resting on the workpiece is lifted and moved in the feed direction. This enables a continuous feed of the device or of the workpieces and uninterrupted joining of long seams.

If the joining device is to be used in joining processes in which a supply of additional materials is necessary (for example soldering and aluminium welding with filler wire), these materials may be supplied via the press elements. For inert-gas welding, nozzles for introducing inert gas may be integrated into the press elements, such that for example the entire space within the press elements can be filled with the inert gas and an optimal covering of the seam can thus be ensured. In addition, the smoke produced during the joining process can be suctioned off via a suction device.

As additional protection against the exit of laser radiation, the press elements may be surrounded by textiles, plastics or bristles, which, when a press element is placed, are also rested on the workpiece (or protrude therebeyond), and for example cover in a light-proof manner any remaining gaps between the press elements and the workpieces.

The press element or press elements may be formed in a step shape or angular shape, wherein a portion projecting or protruding with respect to another portion is formed on the end face of such a press element. This configuration is suitable for example specifically for the production of seams tightly on a workpiece end, for example the edge of a metal sheet, wherein, in the case of press elements advanced toward the workpiece the projecting region rests against the end face of an oppositely arranged press element and the region that is not projecting (the set-back region) rests on the workpiece. The metal sheets are pressed against one another and are thus fixed via the region of the press element that is set back with respect to the projecting region.

Furthermore, the press elements may be designed to supply powder materials or small parts from a corresponding magazine and to position the same at the joining point. Since the press elements may be significantly heated, the press elements may also be equipped with cooling ducts, through which cooling water for example is guided.

BRIEF DESCRIPTION OF THE DRAWINGS

The invention will be illustrated hereinafter on the basis of exemplary embodiments with reference to FIGS. 1 to 9, wherein like or similar features are provided with like reference signs; in the drawings.

DETAILED DESCRIPTION OF THE PREFERRED EMBODIMENT

Figure 1:
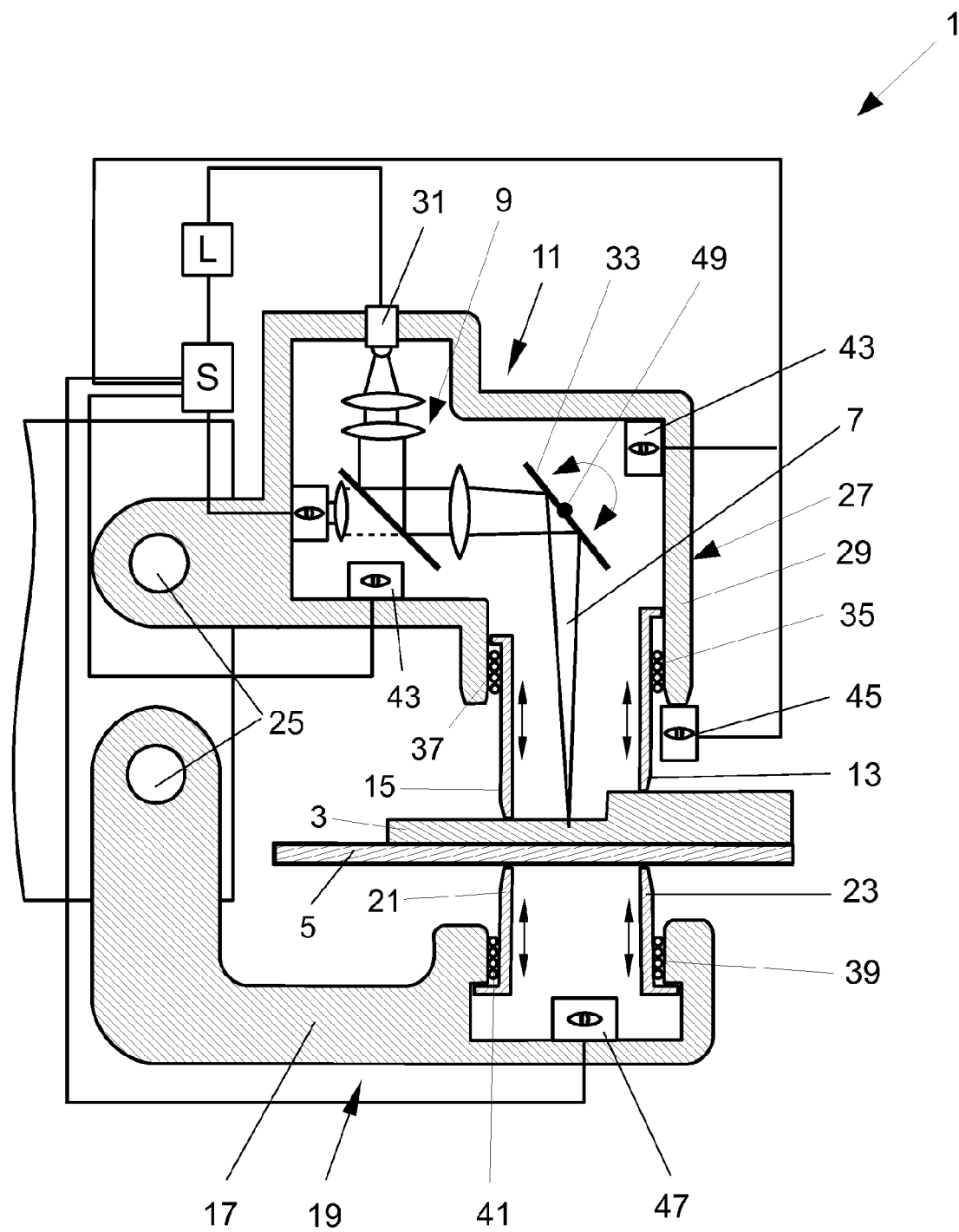
FIG. 1: shows a schematic view of a closed pair of welding tongs with press elements displaceable in the pressing direction.

FIG. 1 shows a laser welding device 1 formed in the manner of a pair of welding tongs 1 in accordance with an embodiment of the invention when joining two workpieces 3, 5 by means of a laser beam 7, wherein the laser beam 7 is guided or positioned by means of a scanner optics 9. The welding tongs 1 comprise two upper press elements 13, 15 arranged on the upper branch 11 of the tongs 1 and two lower press elements 21, 23 arranged on the support 17 of the lower branch 19 of the tongs 1. The branches 11, 19 are pivotably connected to the guide unit 25 and press the workpieces 3, 5 to be joined (here in the form of metal sheets 3,5) against one another via the press guide elements 13, 15, 21, 23. The upper branch 11 forms a housing 27, which houses the scanner optics 9 and the laser beam 7 running from the scanner optics 9 towards the workpieces 3,5. The upper press elements 13,15 form a part of the housing 27 and are movable relative to the rest of the housing or the remainder of the housing 29, wherein, in the configuration according to FIG. 1, the press elements 13, 15 are fitted on the remainder of the housing 29 so as to be displaceable substantially along the pressing direction (in this case for example by means of electromotive actuators 35, 37). The lower press elements 21, 23 are similarly fitted on the support 17 so as to be displaceable by means of actuators 39, 41, such that the press elements 13, 15, 21, 23 can be pressed against the metal sheets 3, 5 and detached therefrom independently of the pressing movement of the branches 11, 19.

According to FIG. 1, the upper workpiece 3 is a step-shaped metal sheet, that is to say it has portions of different metal sheet thickness. Since the upper press elements 13, 15 are displaceable (separately from one another), they can be lowered as far as the height of the respective metal sheet portion and thus (together with the workpiece 3) close the housing 27 in a light-proof manner.

The laser beam 7 is produced by a machining laser 31 and is guided via the lenses and mirrors of the scanner optics (running through the housing 27) over the surface of the upper workpiece 3 by means of a movable scanner mirror 33 of the scanner optics 9, which is fitted pivotably on an axis 49 of a galvanometer drive (not illustrated).

The laser light reflected by the workpieces 3,5 into the scanner optics 9 is detected via the scattered light sensors 43 and the scattered light exiting through a possible gap between the workpieces 3, 5 and the upper press elements 13,15 is detected via the scattered light sensor 45. Should scattered light radiation be determined via the light sensor 45, the machining laser 31 is switched off immediately in order to eliminate a potential risk to individuals. In FIG. 1, a safety unit S, by means of which the intensities detected by the scattered light sensors 43, 45 and the pyrometer 47 can be evaluated, and a laser control unit L, which is connected to the safety unit S and the laser 31, are illustrated schematically. For example, a switch-off signal can be output to the laser control L by the safety unit S when excessively high intensities as determined. The temperature of the lower metal sheet 5 is measured from the side facing away from the process by the pyrometer 47 positioned in the lower branch 19.

Figure 2:
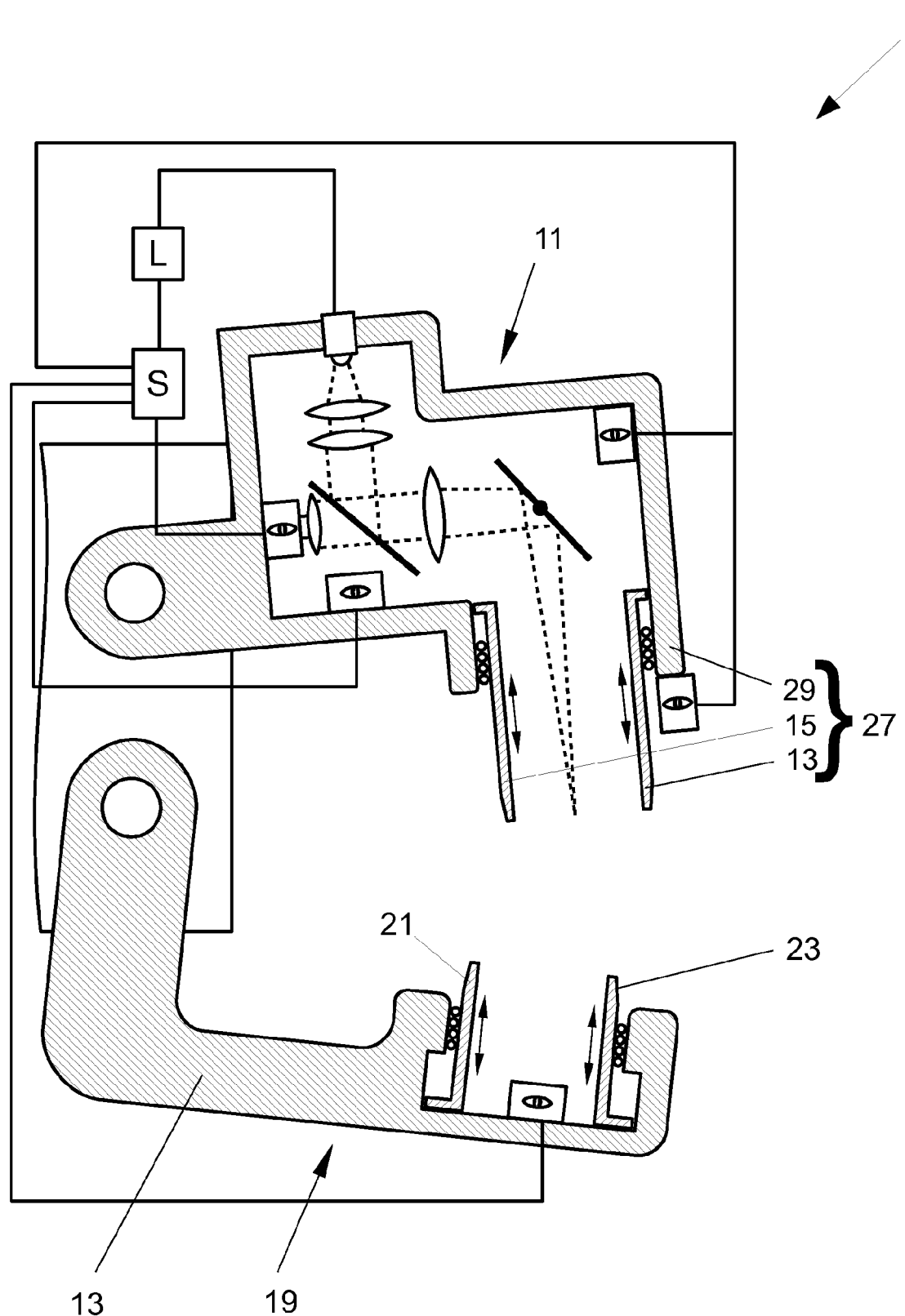
FIG. 2: shows a schematic view of the welding tongs according to FIG. 1 in the open state.

FIG. 2 shows the welding tongs according to FIG. 1 with open branches 11, 19 and retracted press elements 13,15,21, 23; wherein the machining laser 31 is automatically switched off when the branches 11,19 are opened (illustrated in FIG. 2 by the dashed indication of the course of the laser beam). According to FIG. 2, when the welding tongs 1 are open, both branches 11, 19 of the tongs are deflected with respect to their respective closed position (that is to say their position when the tongs 1 are closed). The branch of the tongs 1 that comprises the housing 27 with the scanner optics 9 may also be left unmoved, and merely the respective other (in this case: the lower) branch 19 may be moved in order to open or close the tongs 1, wherein for example a jolting of the scanner optics 9 can be avoided.

Figure 3A:
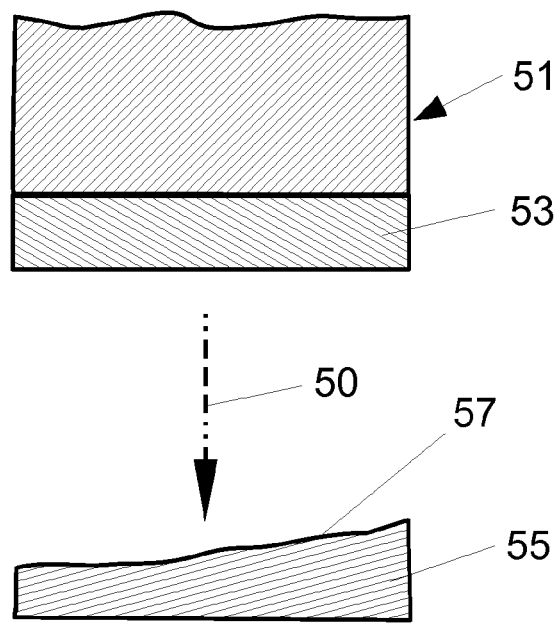
FIGS. 3A, 3B: shows a schematic view of the operating principal of a tiltably arranged press element.
Figure 3B:
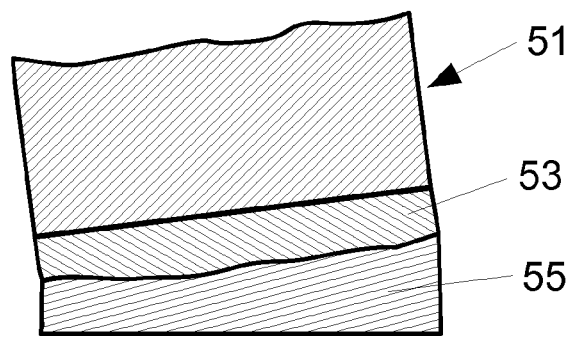

FIGS. 3A and 3B schematically illustrate the operating principal of a press element 51 pivotable or tiltable about a pivot axis running perpendicularly with respect to the pressing direction 50, said press element having a press portion 53 made of a resiliently deformable material. When placing the press element 51 on a wedge-shaped workpiece 55 with an uneven surface 57, the press element 55 tilts and the shape of the flexible press portion 53 adapts to the shape of the workpiece surface 57, such that a light-proof connection is produced between the press element 51 and the surface 57.

Figure 4:
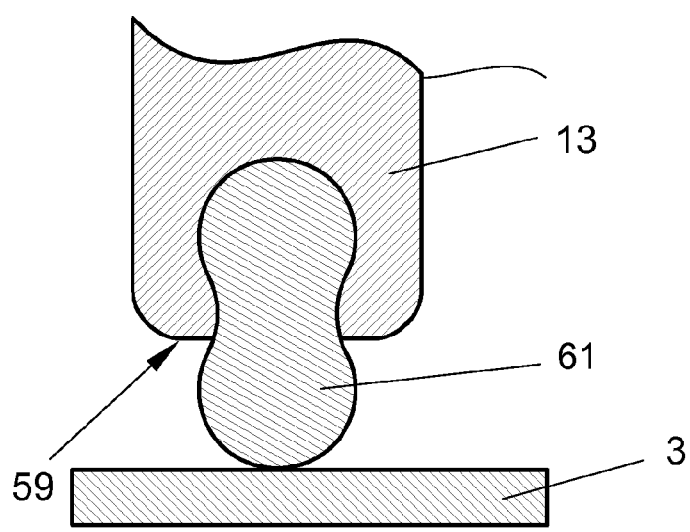
FIG. 4: shows a schematic view of a portion of a press element with a rubber lip.

FIG. 4 shows the press portion or the end face 59 of a press element on the basis of the example of an upper press element 13, wherein a rubber lip 61 is inserted into the end face 59, whereby it is possible to prevent the press element 13 from leaving behind pressure marks on the surface of the metal sheet 3. With uneven workpiece surfaces, the rubber lip 61 additionally ensures a reliable optical seal between the inner face of the press element 13 or of the housing 27 and the outer environment.

Figure 5:
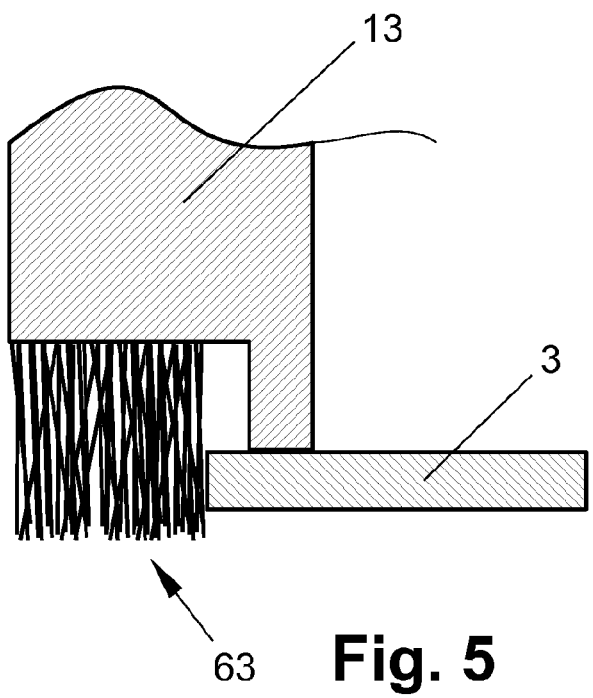
FIG. 5: shows a schematic view of a portion of a press element with bristles.
Figure 6:
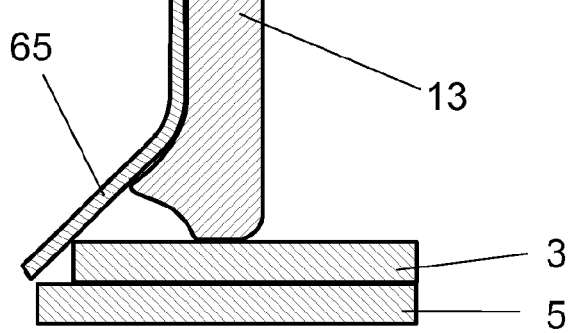
FIG. 6: shows a schematic view of a portion of a press element with a textile sealing lip.

Other possibilities of an optically tight shielding of the surrounding environment with respect to the interior of a press element 13 are illustrated in FIGS. 5 and 6. In the configuration shown in FIG. 5, the optical seal is ensured by means of tightly arranged, flexible bristles 63, which are fastened on the outer edge of the press element 13. In accordance with the configuration illustrated in FIG. 6, a flexible textile fabric 65 is fastened to the outer face of the press element 13 and reliably covers a gap possibly present between the workpiece 3 and the press element 13.

Figure 7:
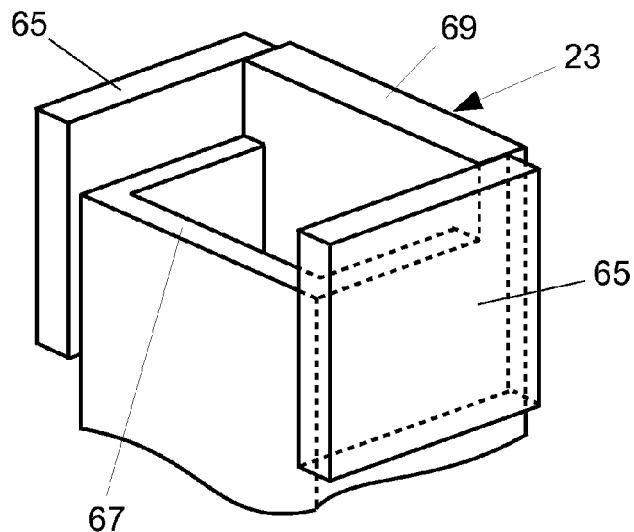
FIG. 7: shows a schematic view of a portion of a stepped press element with a textile sealing lip.
Figure 8:
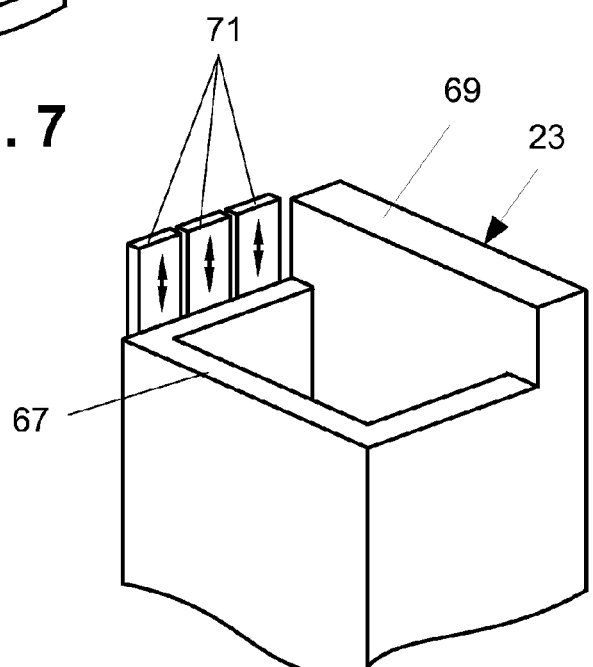
FIG. 8: shows a schematic view of a portion of a stepped press element with displaceable gate

FIGS. 7 and 8 illustrate a stepped press element with a set-back portion 67 and a (by contrast) projecting or protruding portion 69 on the basis of the example of a lower press element 23, wherein such press elements are suitable in particular for welding in the region of the edge regions of the workpieces 3, 5. In the configuration according to FIG. 7, a flexible textile fabric 65 is additionally fitted on the set-back region 67, and, in the configuration according to FIG. 8, (actively or passively) displaceable gates 71 are fitted as optical seals on the set-back region 67.

Figure 9:
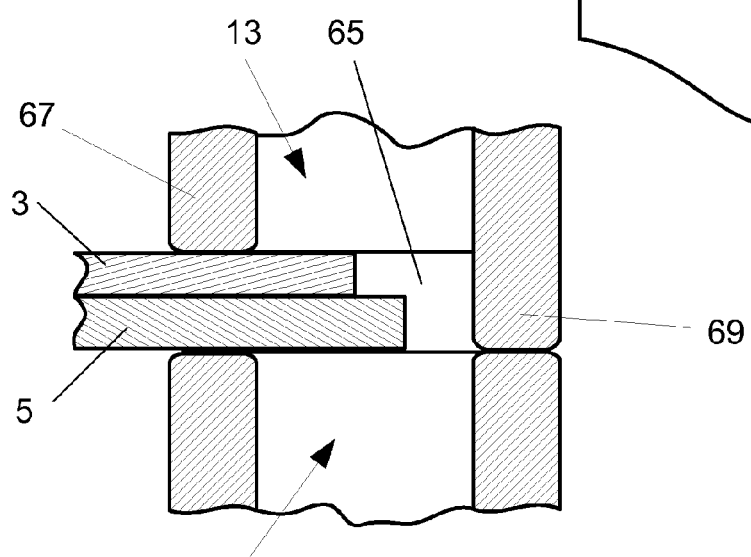
FIG. 9: shows a schematic view of metal sheets clamped by means of a stepped press element.

The use of a stepped upper press element 13 in cooperation with an unstepped lower press element 23 is illustrated in FIG. 9. The projecting portion 69 of the stepped, upper press element 13 bears against the unstepped, lower press element 23. The set-back portion 67 of the stepped press element 13 bears against the metal sheet 3, wherein the gap produced laterally between the set-back portion 67 of the press element 13 and the press element 23 is optically sealed by the flexible textile 65.

LIST OF REFERENCE NUMERALS 1 welding tongs
3 upper workpiece
5 lower workpiece
7 laser beam
9 scanner optics
11 upper branch
13, 15 upper press elements
17 support
19 lower branch
21, 23 lower press elements
25 guide unit
27 housing
29 remainder of the housing
31 machining laser
33 scanner mirror
35, 37 upper actuators
39, 41 lower actuators
43, 45 scattered light sensors
47 pyrometer
49 axis of the galvanometer drive
50 pressing direction
51 tiltable press element
53 press portion made of a flexible material
55 wedge-shaped workpiece
57 uneven surface
59 end face
61 rubber lip
63 bristles
65 flexible textile fabric
67 set-back portion
69 protruding portion
71 gate

The invention claimed is:

1. A laser welding device (1) for joining workpieces (3, 5) by means of a laser beam (7), comprising:
    a scanner optics (9) for guiding the laser beam (7),
    a press element (13,15), which, during the joining process, is pressed along a pressing direction onto at least one of the workpieces (3) in order to fix the workpieces (3, 5),
    a housing (27), which houses the scanner optics (9) and the laser beam (7) running from the scanner optics towards the workpieces (3, 5),
    wherein the press element (13, 15) forms a part of the housing (27) and is movable relative to the rest of the housing by at least one degree of movement freedom.

2. The laser welding device according to claim 1, wherein the scanner optics (9) comprises at least one movable scanner mirror (33) for guiding the laser beam (7).

3. The laser welding device according to claim 1, wherein the press element (51) is mounted on the rest of the housing pivotably about an axis running substantially perpendicularly with respect to the pressing direction (50).

4. The laser welding device according to claim 1, wherein the press element (13, 15) is mounted on the rest of the housing so as to be movable along the pressing direction.

5. The laser welding device according to claim 1, wherein the press element (51) comprises a press portion (53) made of a flexible material.

6. The laser welding device according to claim 1, wherein the housing (27) comprises a plurality of press elements (13, 15), which each form a part of the housing and are movable relative to the rest of the housing by at least one degree of movement freedom.

7. The laser welding device according to claim 6, wherein the scanner optics (9) is formed in such a way that the laser beam (7) can be deflected therefrom to a respective one of the press elements and to the workpiece fixed by said press element.

8. The laser welding device according to claim 1, wherein the laser welding device is formed as a pair of welding tongs (1), wherein the housing (27) with the at least one press element (13, 15) forms a branch (11) of the welding tongs, and a support (17) with at least one further press element (21, 23) forms the second branch (19) of the welding tongs.

9. The laser welding device according to claim 1, wherein the laser welding device is formed as a pair of welding tongs, and wherein each branch of the welding tongs comprises a housing, in which a scanner optics for guiding a laser beam is arranged, with at least one press element.

10. A method for joining workpieces by means of a laser beam, characterised in that the workpieces are joined by means of a laser welding device according to claim 1.

* * * * *